Figure 1:
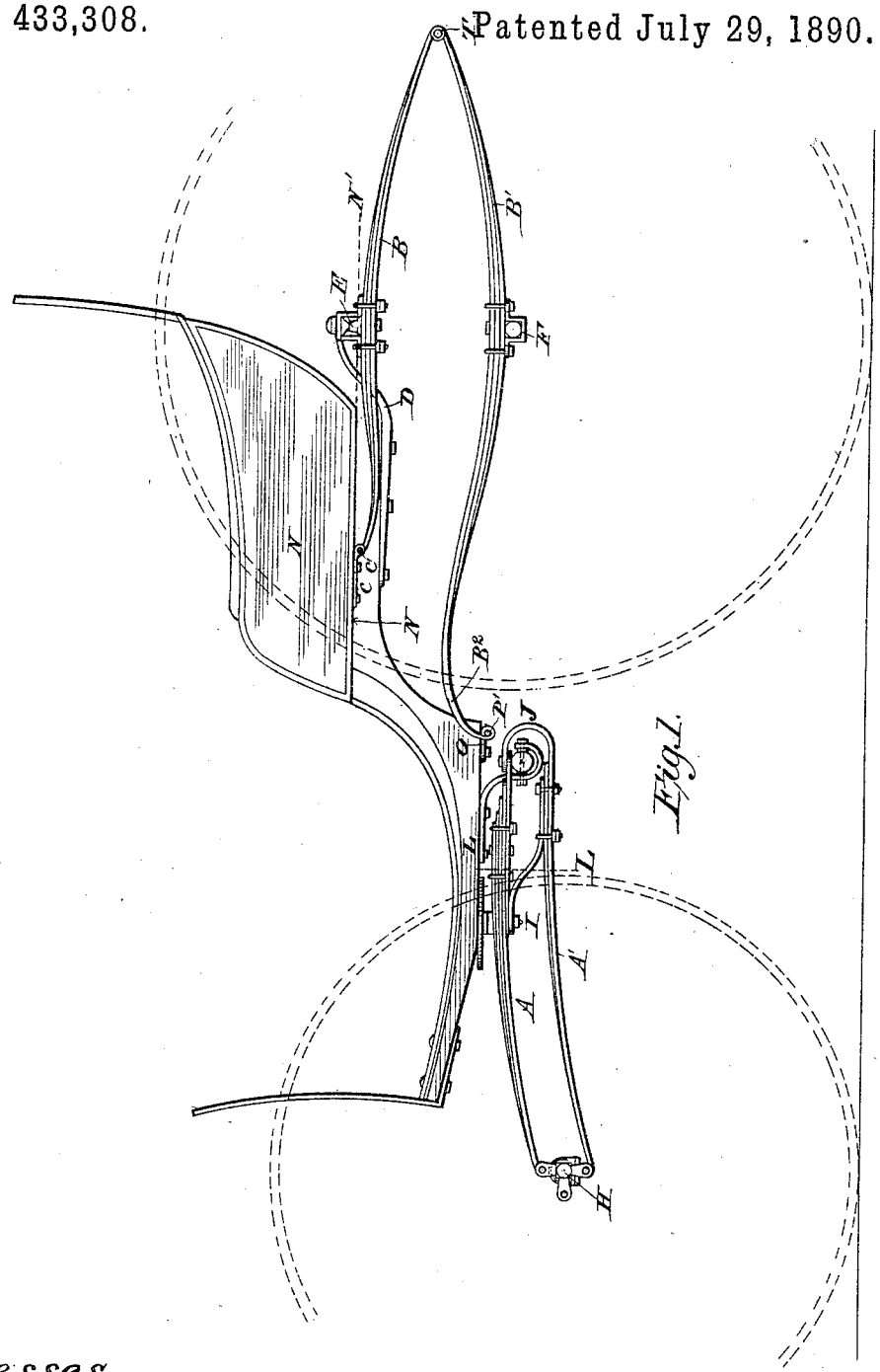

(No Model.) 2 Sheets—Sheet 1.

C. W. SALADEE.
SPRING PLATFORM FOR ROAD WAGONS.

No. 433,308. Patented July 29, 1890.

Witnesses:
Inventor

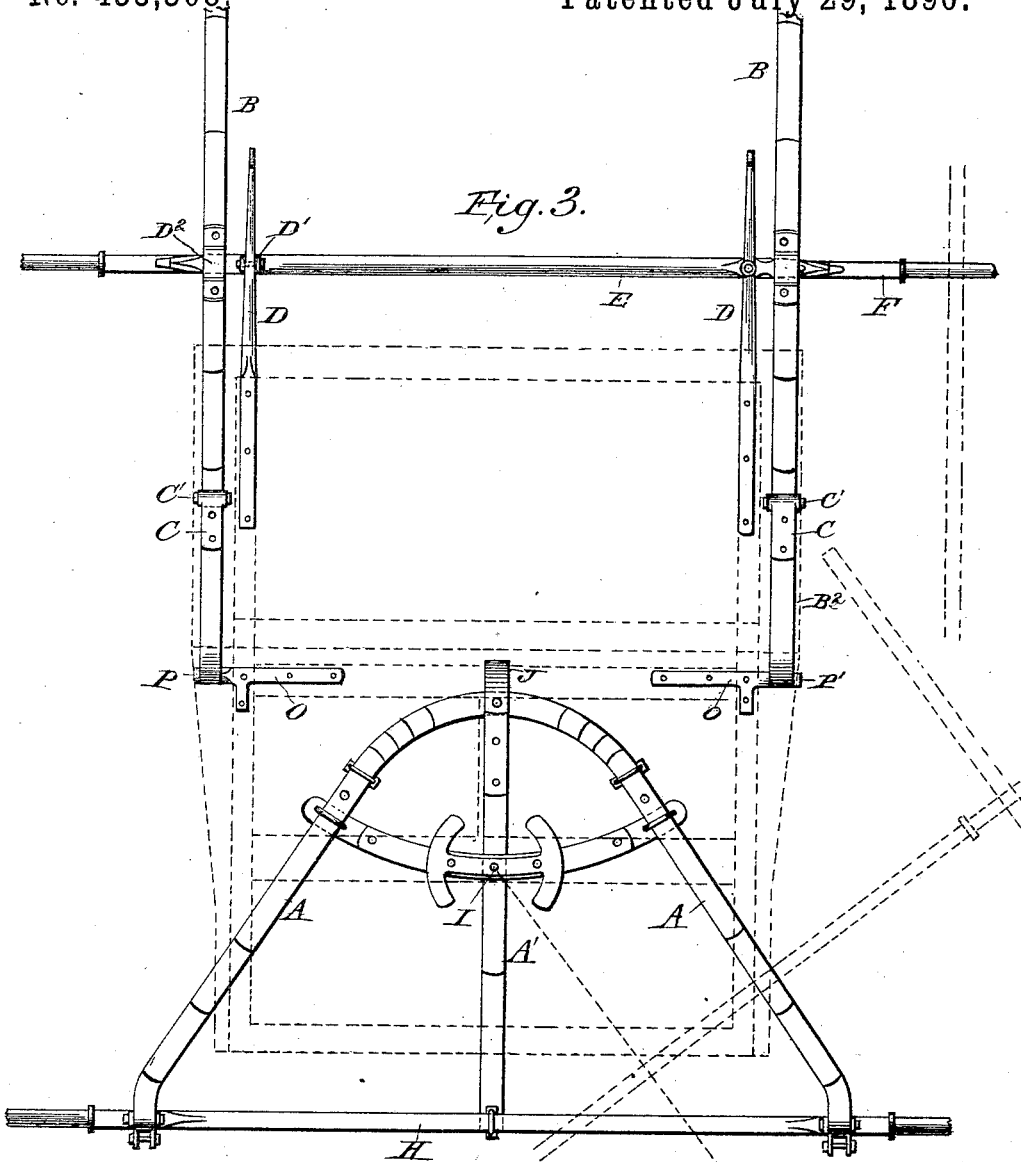

UNITED STATES PATENT OFFICE.

CYRUS. W. SALADEE, OF CLEVELAND, OHIO.

SPRING-PLATFORM FOR ROAD-WAGONS.

SPECIFICATION forming part of Letters Patent No. 433,308, dated July 29, 1890.

Application filed April 1, 1890. Serial No. 346,217. (No model.)

*To all whom it may concern:*

Be it known that I, CYRUS W. SALADEE, a citizen of the United States, and residing in the city of Cleveland, State of Ohio, have invented certain new and useful Improvements in Pleasure-Vehicles, of which the following is a specification embodying my invention, and the same is specifically pointed out in the appended claims.

The invention relates more especially to that denomination of vehicles popularly known as the "phaeton," having a "drop-front" or depressed foot-rest which is rearwardly extended and elevated to support thereon a seat.

The primary object of the invention is, first, to provide the drop-front of a phaeton-body with a spring-platform of such construction as will admit of hanging it lower and turning the vehicle in a shorter area than heretofore, as also to greatly simplify the cost of manufacture of this special class of vehicle; second, to provide a more simple and effective spring-platform adapted to support the rear end of the body as well as to improve the style and general appearance of the complete structure, all as hereinafter more fully set forth, and as shown in the accompanying drawings.

In the drawings, Figure 1 is in this instance a side elevation of a phæton representing my improvements. Fig. 2 is a plan view of the front platform. Fig. 3 is a plan view of the rear platform.

The body seen in Fig. 1 is one of the usual style of two-passenger phaetons having a drop-front L and an elevated seat N. To the bottom frame of the drop-front is secured a fifth-wheel device, side springs radiating therefrom and extending to the axle, substantially as seen in Figs. 1 and 2. For this combination of a platform with the drop-front L of a phaeton-body, whereby to secure the short turning of the vehicle, I propose to employ either of the platforms adapted to this purpose shown in any of my former patents or pending applications. In either case the fifth-wheel device is secured to the bottom of the drop-front L and is adapted to maintain the inner ends of the side springs A A extended therefrom to the axle, and, if desired, a central spring A' may also extend from said fifth-wheel device to the axle, as seen in Figs. 1 and 2. This combination of a drop-front in a phaeton and the spring platform described not only admits of carrying the front end of this special class of body lower than when supported by the springs now generally used, but the cost of construction, as before stated, is materially lessened, while a lighter and more stylish appearance is imparted thereto.

The rear end of the body is supported upon side springs arranged on each side of the body, substantially as shown in Figs. 1 and 3. These side springs consist of two members B and B', which are pivotally united at their rear ends T, and their front ends are separately connected in their relation to the side of the body. In this instance the front end of the upper members B is preferably shackled to the bottom frame of the seat N, as at C C', and the front end of the lower member B' is curved downward, as at B², and pivoted to the bottom frame of the drop-front L, as at P', which in this instance consists of the projecting braces O, (see Fig. 2,) terminating in a trunnion-bearing passed through the eye of the spring, and the latter secured thereon by a nut, as at P', Fig. 3. The elevated rear portion of the body is supported upon the upper member of the spring, preferably by loops D D, having their inner ends secured to the elevated frame under the seat and their outer ends sustained by said upper members of the springs or by a cross-bar E, uniting the upper members of said springs, as shown in Figs. 1 and 3. When preferred, the outer ends of the loops D may be pivotally connected to the cross-bar E, as at D', Fig. 3, or directly attached to the upper member of the spring at D² and omitting the cross-bar.

It will be understood that the rear spring-platform described is not limited in its application to the body seen in Fig. 1, but is equally desirable and practicable in all classes of bodies having a depressed foot-rest and an elevated seat behind, whether for a two or four passenger vehicle. It will be further observed that this rear spring-platform may be employed in vehicles with or without a reach connecting the axles and act equally well in either case, and that it is my purpose to so employ the same.

Without limiting my claims to the precise arrangement of the several parts shown and described, I claim—

1. The combination, in a pleasure-vehicle, of a phaeton-body having a drop-front, the frame of which is rearwardly extended and elevated to support thereon a seat, side springs extended from a fifth-wheel device secured to the bottom of the body to the axle at widely-separated points, said elevated rear portion of the body being connected to the upper member B of the side springs supported on the rear axle by "body loops" D, said upper member B pivoted to the lower member B' at T, and the forward end of the latter being pivotally connected to said drop-front L, substantially as shown and described.

2. The combination, in a four-wheeled pleasure-vehicle, of a phaeton-body constructed with a drop-front or depressed foot-rest L, the frame of which latter is rearwardly extended and elevated to support thereon a seat N, a rear spring-platform consisting of the axle F, and side springs, each composed of two members B and B', which latter are pivotally connected together at their rear ends T and having the front end of the upper member secured to the elevated rear frame of said body by loops D, and the forward end of the lower member pivotally secured to said drop-front L, substantially as specified.

3. The combination, in a rear spring-platform for pleasure-vehicles of the axle and side springs, each consisting of two members B and B', having their rear ends T pivotally united, the upper member B being secured to the elevated rear frame of the body by loops D, and having the forward end of the lower member B' pivotally secured to the drop-front L, substantially as shown and described.

4. The combination, in a rear spring-platform for pleasure-vehicles, of the axle, side springs, each consisting of two members B and B', having their rear ends T pivotally united, a transverse bar E, supported upon the upper members B, and loops D, extended from the elevated rear portion of the body to said transverse bar and having the forward ends of the lower members B' pivotally connected to the drop-front L, substantially as shown and described.

In testimony whereof I have signed this specification in the presence of two subscribing witnesses.

CYRUS W. SALADEE.

Witnesses:
J. A. CRAIN,
L. PEARSON.